(12) United States Patent
Delong

(10) Patent No.: US 10,948,082 B2
(45) Date of Patent: Mar. 16, 2021

(54) ADDITIVELY MANUFACTURED SEAL PLATE

(71) Applicant: Hamilton Sundstrand Corporation, Charlotte, NC (US)

(72) Inventor: Zachary J. Delong, Roscoe, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 179 days.

(21) Appl. No.: 16/030,127

(22) Filed: Jul. 9, 2018

(65) Prior Publication Data
US 2020/0011419 A1 Jan. 9, 2020

(51) Int. Cl.
*F16J 15/02* (2006.01)
*B33Y 80/00* (2015.01)

(52) U.S. Cl.
CPC .............. *F16J 15/022* (2013.01); *B33Y 80/00* (2014.12)

(58) Field of Classification Search
CPC .......... F16J 15/022; F16J 15/12; F16J 15/121; F16J 15/122; F16J 15/127; B33Y 80/00
See application file for complete search history.

(56) References Cited

U.S. PATENT DOCUMENTS

| | | | |
|---|---|---|---|
| 2005/0127615 A1* | 6/2005 | Matsuki | F16J 15/122 277/592 |
| 2018/0207861 A1* | 7/2018 | Lowinger | F16J 1/00 |
| 2019/0277402 A1* | 9/2019 | Kreig | B29C 64/10 |

FOREIGN PATENT DOCUMENTS

| CN | 1605739 A | 4/2005 |
|---|---|---|
| CN | 105556078 A | 5/2016 |

OTHER PUBLICATIONS

European Search Report Issued in EP Application No. 19185248.2, dated Nov. 11, 2019, 8 Pages.

* cited by examiner

*Primary Examiner* — Gilbert Y Lee
(74) *Attorney, Agent, or Firm* — Cantor Colburn LLP

(57) ABSTRACT

A method of forming a seal plate for sealing between two components of an assembly includes forming a plate element from a first material, the plate element including at least one seal groove receptive of a seal element and forming a seal element from a second material different from the first material by one or more additive manufacturing processes, the second material an elastomeric material of a selected durometer. The seal element is affixed to the plate element at the seal groove. A seal plate includes a plate element having one or more seal grooves receptive of a seal element, the plate element formed from a first material. A seal element is installed into the seal groove, the seal element formed from a second material different from the first material by one or more additive manufacturing processes, the second material an elastomeric material of a selected durometer.

10 Claims, 3 Drawing Sheets

ADDITIVELY MANUFACTURED SEAL PLATE

BACKGROUND

Exemplary embodiments pertain to the art of seals. More particularly, the present disclosure relates to seal plates configured and utilized as static seals between components.

Seal plates are used in a wide variety of applications including, for example, transmission manifolds, gearbox split lines, and other components which may or may not have a high production volume. A typical seal plate is made by machining a metal plate to include a seal groove or seal grooves. A seal element, for example, an elastomeric seal, is then overmolded and cured at the seal groove of the metal plate.

Overmolding of the seal element requires complex, expensive tooling to consistently produce the required seal. Such tooling, especially for components having a relatively low production volume or rate, can is some applications be significantly more expensive than the finished seal plate. In some applications, the tooling cost may be up to or more than 10 times the product cost.

BRIEF DESCRIPTION

In one embodiment, a method of forming a seal plate for sealing between two components of an assembly includes forming a plate element from a first material, the plate element including at least one seal groove receptive of a seal element and forming a seal element from a second material different from the first material by one or more additive manufacturing processes, the second material an elastomeric material of a selected durometer. The seal element is affixed to the plate element at the seal groove.

Additionally or alternatively, in this or other embodiments the seal element is cured prior to affixing the seal element to the plate element at the seal groove.

Additionally or alternatively, in this or other embodiments the plate element is formed by machining and/or molding.

Additionally or alternatively, in this or other embodiments the plate element is metallic.

Additionally or alternatively, in this or other embodiments the seal element is formed in the seal groove of the completed plate element via an additive manufacturing process.

Additionally or alternatively, in this or other embodiments the seal element is formed separately from the plate element.

Additionally or alternatively, in this or other embodiments the plate element and the seal element are formed concurrently by one or more additive manufacturing processes.

Additionally or alternatively, in this or other embodiments the seal element is affixed to the plate element during the one or more additive manufacturing processes.

Additionally or alternatively, in this or other embodiments the seal element is affixed to the plate element via one or more mechanical fasteners.

Additionally or alternatively, in this or other embodiments the plate element is formed from a composite material.

Additionally or alternatively, in this or other embodiments a seal base of the seal element is formed from a first elastomeric material having a first durometer, and a seal body element extends from the seal base, the seal body formed from a second elastomeric material having a second durometer less than the first durometer.

In another embodiment, a seal plate includes a plate element, the plate element having one or more seal grooves receptive of a seal element, the plate element formed from a first material. A seal element is installed into the seal groove, the seal element formed from a second material different from the first material by one or more additive manufacturing processes, the second material an elastomeric material of a selected durometer.

Additionally or alternatively, in this or other embodiments the seal element includes a seal base affixed to the seal groove, and a seal body extending from the seal base to a seal tip.

Additionally or alternatively, in this or other embodiments the seal base is formed from a first elastomeric material having a first durometer, and the seal body element is formed from a second elastomeric material having a second durometer less than the first durometer.

Additionally or alternatively, in this or other embodiments the plate element are formed concurrently by one or more additive manufacturing processes.

Additionally or alternatively, in this or other embodiments the seal element is affixed to the plate element during the one or more additive manufacturing processes.

Additionally or alternatively, in this or other embodiments the seal element is affixed to the plate element via one or more mechanical fasteners.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
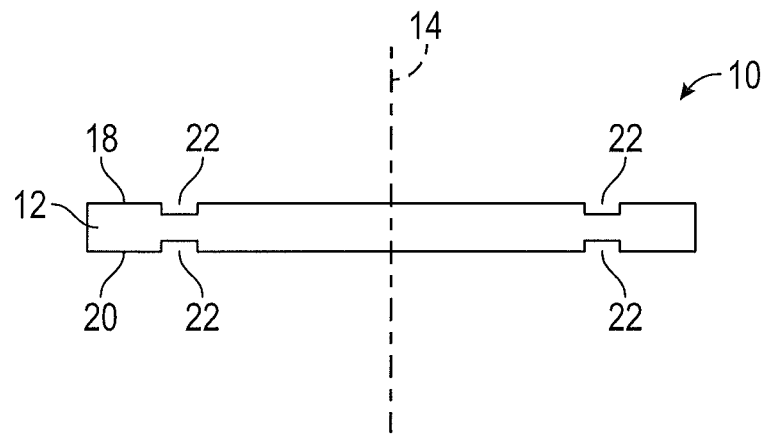
FIG. 1 is a cross-sectional view of an embodiment of a seal plate.
Figure 2:
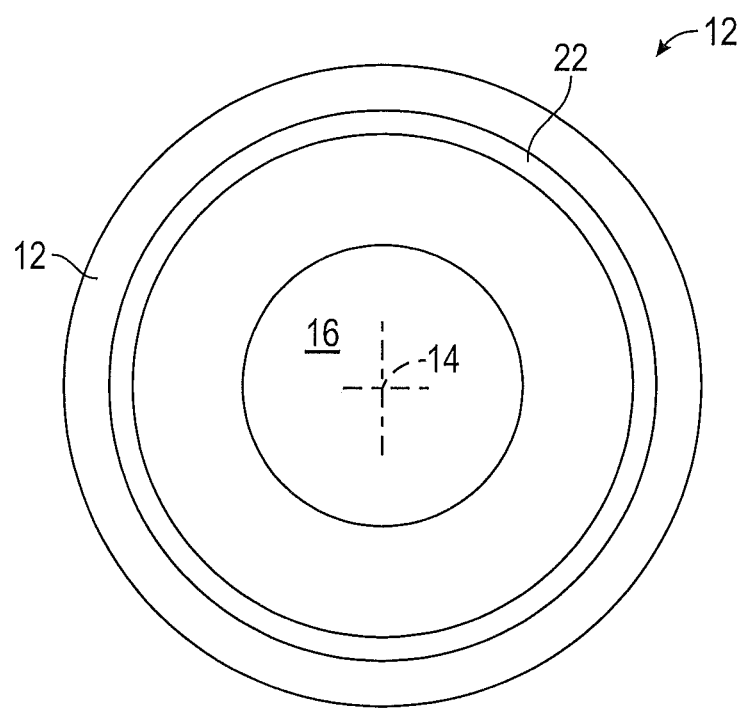
FIG. 2 is a plan view of an embodiment of a seal plate.

An embodiment of a seal plate 10 is illustrated in the cross sectional view of FIG. 1 and the plan view of FIG. 2. The seal plate 10 includes a plate element 12, which in some embodiments is circular about a central axis 14, but may in other embodiments have other cross-sectional shapes, depending on the components between which the seal plate 10 is located to provide sealing between the components. In some embodiments, the plate element 12 includes one or more plate openings 16 to allow for components, such as a shaft or the like to pass through the plate element 12 from a first plate side 18 to a second plate side 20.

The plate element 12 includes at least one seal groove 22. The seal groove 22 is a recess formed inwardly from a plate outer surface 24, and in some embodiments may have a rectangular cross-sectional shape. As is shown in FIG. 1, in some embodiment, the plate element 12 includes two seal grooves 22, one seal groove 22 formed at each of the first plate side 18 and the second plate side 20. Further, in other embodiments, two or more seal grooves 22 may be provided at the first plate side 18 or the second plate side 20.

Figure 3:
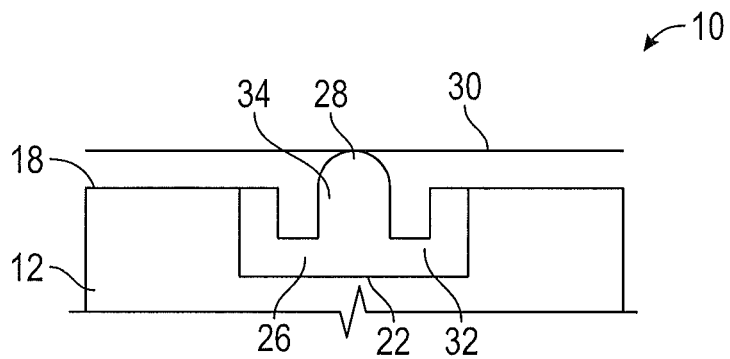
FIG. 3 is a cross-sectional view of an embodiment of a seal plate.
Figure 4:
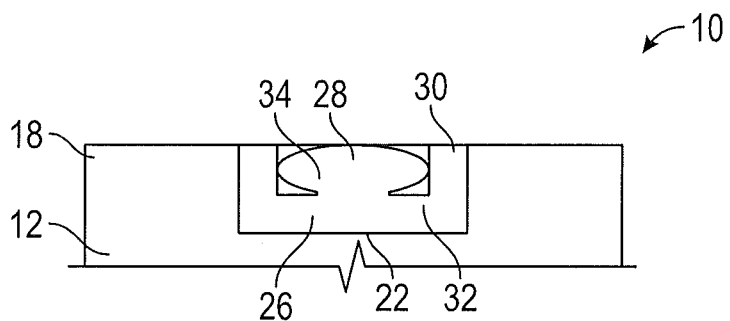
FIG. 4 is another cross-sectional view of the embodiment of FIG. 3.

Referring now to FIG. 3, the seal groove 22 is configured to receive a seal element 26 therein. As shown in FIG. 3, in a free state a seal tip 28 of the seal element 26 extends outside of the seal groove 22, while in an installed position abutted to a component 30, the seal element 26 is compressed to seal between the seal plate 10 and the component 30.

The seal element 26 may include a seal base 32 and a seal body 34 extending from the seal base 32 to the seal tip 28. The seal element 26 is formed from, for example, an elastomeric material having a selected durometer or hardness to be compressible to the extent desired, while also providing the needed sealing. In some embodiments, the elastomeric material includes one or more additives or secondary materials to achieve the selected durometer. Further, while in some embodiments the seal base 32 and the seal body 34 are formed from the same material, in other embodiments, the materials may be different. For example, the seal base 32 may be formed from a first material having a first durometer higher than a second durometer of a second material utilized to form the seal body 34.

Figure 5:
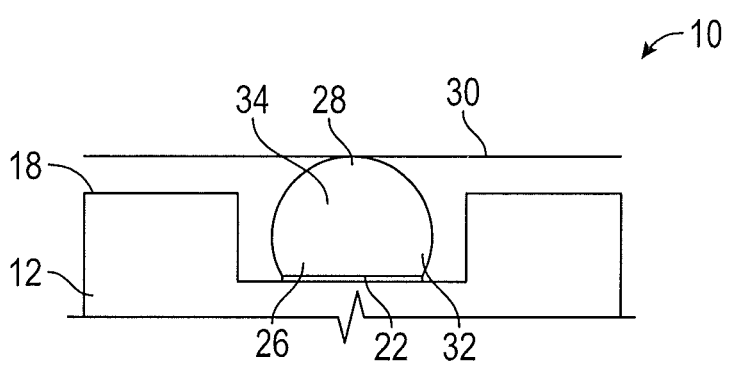
FIG. 5 is another cross-sectional view of an embodiment of a seal plate.
Figure 6:
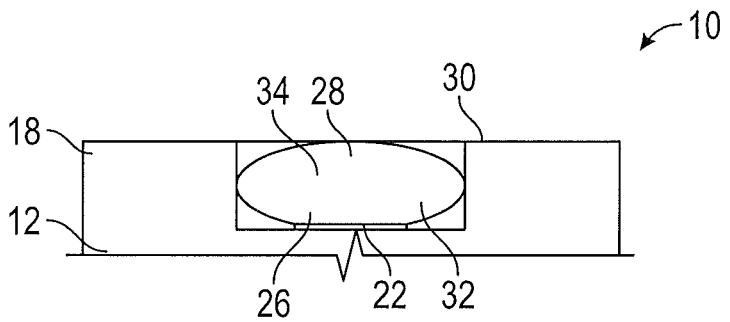
FIG. 6 is another cross-sectional view of the embodiment of FIG. 5.

While one configuration of the seal element 26, another exemplary configuration is illustrated in FIGS. 5 and 6. In this embodiment, the seal base 32 is planar, while the seal body 34 has a partially circular cross-section.

Figure 7:
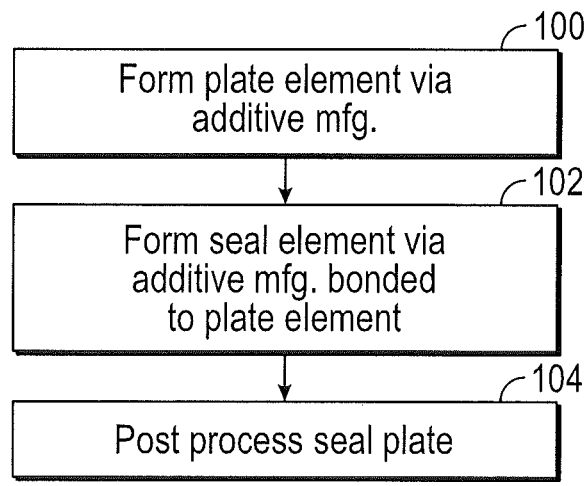
FIG. 7 is a schematic illustration of a method of forming a seal plate.

Referring now to FIG. 7, a method of forming a seal plate 10 is schematically shown. In the embodiment of FIG. 7, the seal plate 10 is formed fully by one or more additive manufacturing processes. Such a method requires that the plate element 12 and the seal element 26 are formed from materials that are compatible to bond to one another during the additive manufacturing process. The plate element 12 is formed from, for example, a composite material having high compressive strength capabilities. The seal element 26 is formed from the material having a selected durometer for effective sealing.

At step 100, the plate element 12 is formed via additive manufacturing processes, including formation of the seal grooves 22 utilizing the first material. At step 102, in some embodiments part of the same process as step 100, the seal element 26 is formed in the seal grooves 22 utilizing the second material and bonds to the first material. The completed seal plate 10 may be cured or post-processed as necessary at step 104.

Figure 8:
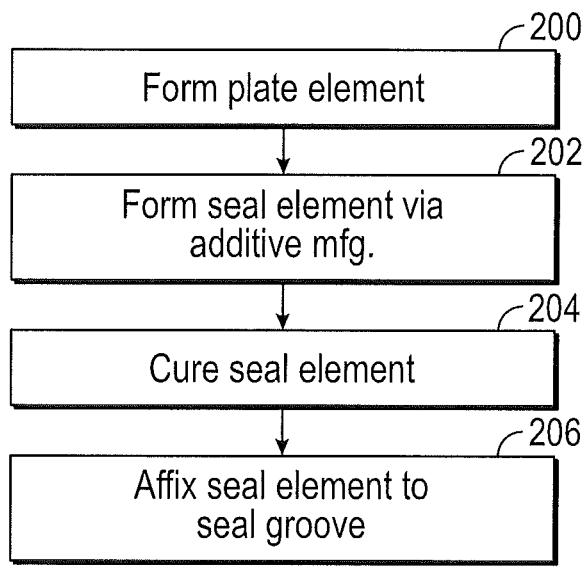
FIG. 8 is another schematic illustration of a method of forming a seal plate.

Referring now to FIG. 8, in another embodiment only the seal element 26 is formed via additive manufacturing, while the plate element 12 is formed by other manufacturing processes. In step 200, the plate element 12 is formed by, for example, machining for a metallic plate element 12 or molding for a non-metallic or composite plate element 12. At step 202, the seal element 26 is formed via one or more additive manufacturing processes. The seal element 26 may be cured if necessary at step 204. Once the seal element 26 is formed and cured, the seal element 26 is adhered to the plate element 12 at the seal groove 22 via, for example, an adhesive or other material or fastening at step 206. In other embodiments, the seal element 26 is formed in situ in the seal groove 22 via additive manufacturing. In such an embodiment, the forming of the seal element 22 at step 202 and the adhering the seal element 26 at the seal groove 22 at step 206 are essentially combined into a single step.

Figure 9:
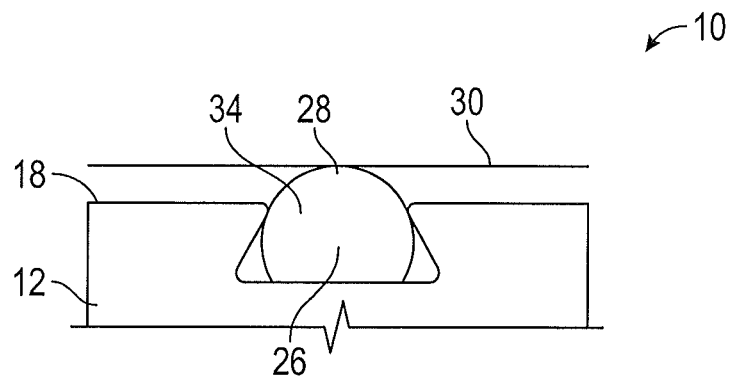
FIG. 9 is a cross-sectional view of a seal plate arrangement with mechanical fastening.

In another embodiment, such as shown in FIG. 9, the seal groove 22 may have a dovetail shape to secure the seal element 26 at the seal groove 22. While a dovetail joint is illustrated in FIG. 9, it is to be appreciated that other mechanical fastening, such as pins, screws or spot bonding may be utilized to secure the seal element 26 at the seal groove.

The use of additive manufacturing to form at least the seal element 26 of the seal plate 10 achieves the desired complex shape of the seal element 26, without the use of complex and costly molding or overmolding tools. This greatly reduces the cost of the seal plate 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of forming a seal plate for sealing between two components of an assembly, comprising:
    forming a plate element from a first material, the plate element including at least one seal groove receptive of a seal element;
    forming the seal element from a second material different from the first material by one or more additive manufacturing processes, the second material an elastomeric material of a selected durometer; and
    affixing the seal element to the plate element at the seal groove;
    wherein the plate element and the seal element are formed concurrently by one or more additive manufacturing processes.

2. The method of claim 1, further comprising curing the seal element prior to affixing the seal element to the plate element at the seal groove.

3. The method of claim 1, wherein the plate element is formed by machining and/or molding.

4. The method of claim 3, wherein the plate element is metallic.

5. The method of claim 1, further comprising forming the seal element in the seal groove of the completed plate element via an additive manufacturing process.

6. The method of claim 1, wherein the seal element is formed separately from the plate element.

7. The method of claim 1, wherein the seal element is affixed to the plate element during the one or more additive manufacturing processes.

8. The method of claim 1, wherein the seal element is affixed to the plate element via one or more mechanical fasteners.

9. The method of claim 1, wherein the plate element is formed from a composite material.

10. The method of claim 1, further comprising:
   forming a seal base of the seal element from a first elastomeric material having a first durometer; and
   forming a seal body element extending from the seal base, the seal body formed from a second elastomeric material having a second durometer less than the first durometer.

\* \* \* \* \*